(12) United States Patent
Tang et al.

(10) Patent No.: US 10,978,941 B2
(45) Date of Patent: Apr. 13, 2021

(54) VIBRATION MOTOR

(71) Applicant: AAC Technologies Pte. Ltd., Singapore (SG)

(72) Inventors: Yun Tang, Shenzhen (CN); Lubin Mao, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 15 days.

(21) Appl. No.: 16/527,003

(22) Filed: Jul. 30, 2019

(65) Prior Publication Data
US 2020/0044534 A1 Feb. 6, 2020

(30) Foreign Application Priority Data
Aug. 3, 2018 (CN) .......................... 201821255551.2

(51) Int. Cl.
*H02K 33/12* (2006.01)
*H02K 33/18* (2006.01)
*B06B 1/04* (2006.01)

(52) U.S. Cl.
CPC ............. *H02K 33/12* (2013.01); *H02K 33/18* (2013.01); *B06B 1/045* (2013.01)

(58) Field of Classification Search
CPC ........ H02K 33/12; H02K 33/18; H02K 33/16; B06B 1/045
See application file for complete search history.

(56) References Cited

U.S. PATENT DOCUMENTS

| 9,762,169 | B1* | 9/2017 | Mao | B06B 1/0238 |
| 2017/0012517 | A1* | 1/2017 | Huang | H02K 33/00 |
| 2017/0117790 | A1* | 4/2017 | Mao | H02K 33/02 |
| 2017/0117794 | A1* | 4/2017 | Wang | H02K 33/18 |
| 2018/0115230 | A1* | 4/2018 | Mao | H02K 33/02 |

FOREIGN PATENT DOCUMENTS

| JP | 2002143770 A1 | 5/2002 |
| JP | 2010104894 A1 | 5/2010 |
| JP | 2017018936 A1 | 1/2017 |
| JP | 2017118805 A1 | 6/2017 |
| WO | 2017103424 A1 | 6/2017 |

* cited by examiner

*Primary Examiner* — Naishadh N Desai
(74) *Attorney, Agent, or Firm* — W&G Law Group LLP

(57) ABSTRACT

A vibration motor in the present disclosure includes a housing having an accommodating space, a first vibrator accommodated in the housing and having a magnetic steel, a driving apparatus disposed opposite to the magnetic steel and configured to drive the first vibrator, an elastic part elastically supporting the first vibrator, and a circuit board. The vibration motor further includes a primary coil electrically connected to the circuit board. The driving apparatus is a secondary coil disposed separately from the primary coil. The primary coil is electrically connected to the outside by using the circuit board to generate an alternating electromagnetic field, to cause the secondary coil and generates an induced electromotive force, and cause relative vibration between the secondary coil and the first vibrator. The present disclosure simplified structure, saved space, and avoided reliability problems such as winding and breaking, thereby effectively improving the product reliability performance.

9 Claims, 4 Drawing Sheets

VIBRATION MOTOR

TECHNICAL FIELD

The present disclosure relates to a vibration motor, and in particular, to a linear vibration motor that vibrates along a horizontal direction.

BACKGROUND

With the development of electronic technologies, portable consumer electronic products become more popular with people. The portable consumer electronic products, such as mobile phones, handheld game consoles, navigation apparatuses, and handheld multimedia entertainment devices generally use a vibration motor to provide system feedbacks, for example, in an incoming call prompt of a mobile phone, an information prompt, a navigation prompt, and vibration feedback of a game console. Such a wide range of application requires high performance of the vibration motor and a long service life.

A vibration motor generally includes a housing having an accommodating space, a vibrator accommodated in the accommodating space, and an elastic part connecting the housing and the vibrator. The elastic part supports the vibrator to move reciprocally in the housing to vibrate. Generally, the existing vibration motor implements an electrical connection by welding a conductive wire to a circuit board. However, cabling of the electrical connection in such a manner is inconvenient, has a complex structure, and occupies a relatively large space. Consequently, it is difficult to meet the requirement.

Therefore, it is necessary to provide a new vibration motor to solve the foregoing problems.

DETAILED DESCRIPTION

Figure 1:
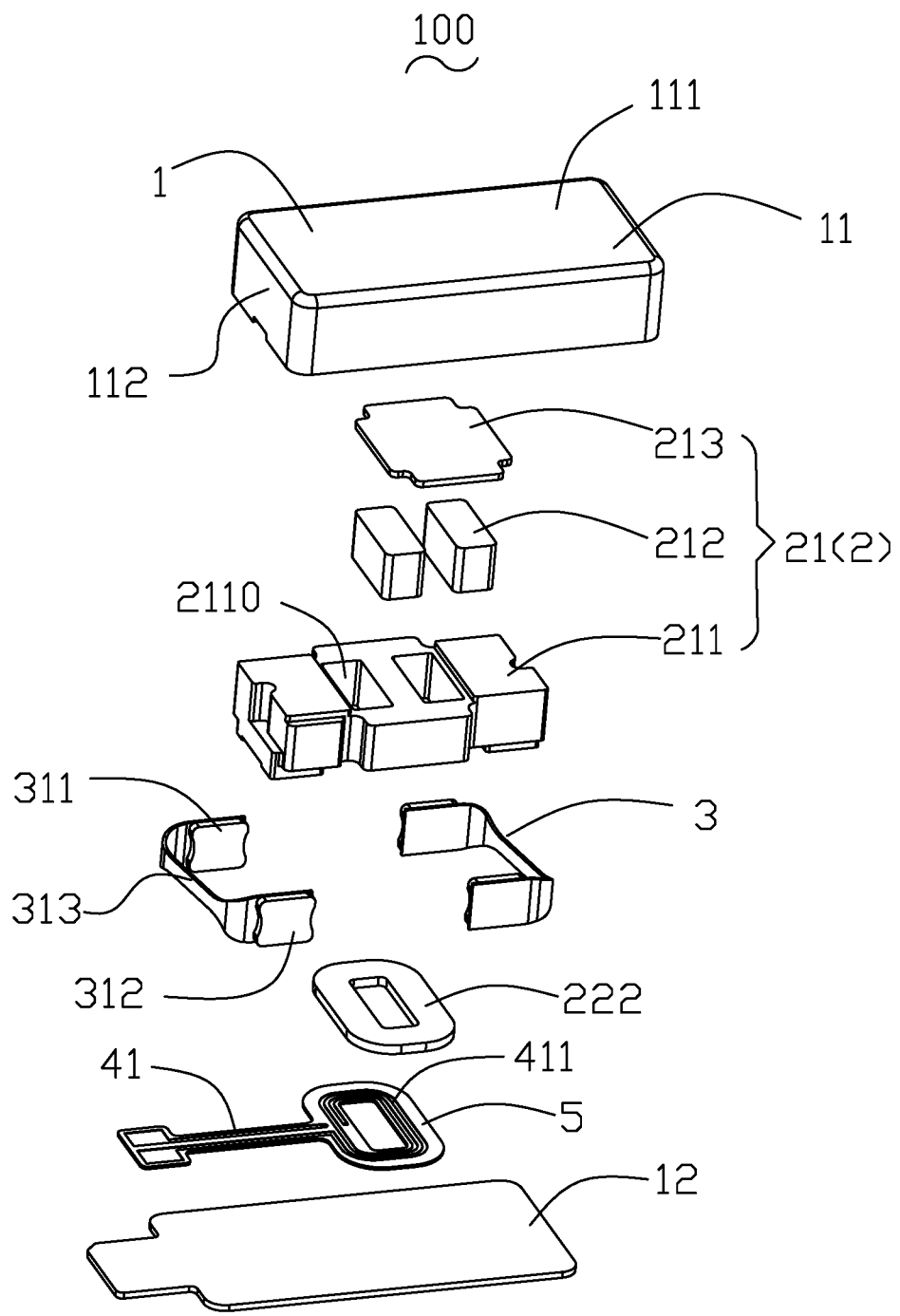
FIG. 1 is an exploded schematic structural diagram of a vibration motor according to Embodiment 1 of the present disclosure.

The present disclosure is further described below with reference to the accompanying drawings.

The present disclosure provides a vibration motor 100, including a housing 1 having an accommodating space, a vibrator 2 accommodated in the housing 1 and having a magnetic steel, an elastic part 3 elastically supporting the vibrator 2, an electrically connected component 4 electrically connected to the outside, and a primary coil 5 electrically connected to the electrically connected component 4.

Further, in the vibration motor 100, a secondary coil 222 is disposed opposite to the primary coil 5. The secondary coil 222 may be disposed on the vibrator, or disposed on the housing. The primary coil 5 is electrically connected to the outside and generates an alternating electromagnetic field, to cause the secondary coil to generate an induced electromotive force, and cause relative vibration between the secondary coil and the first vibrator.

A description is provided below with reference to specific implementations.

Embodiment 1

Figure 2:
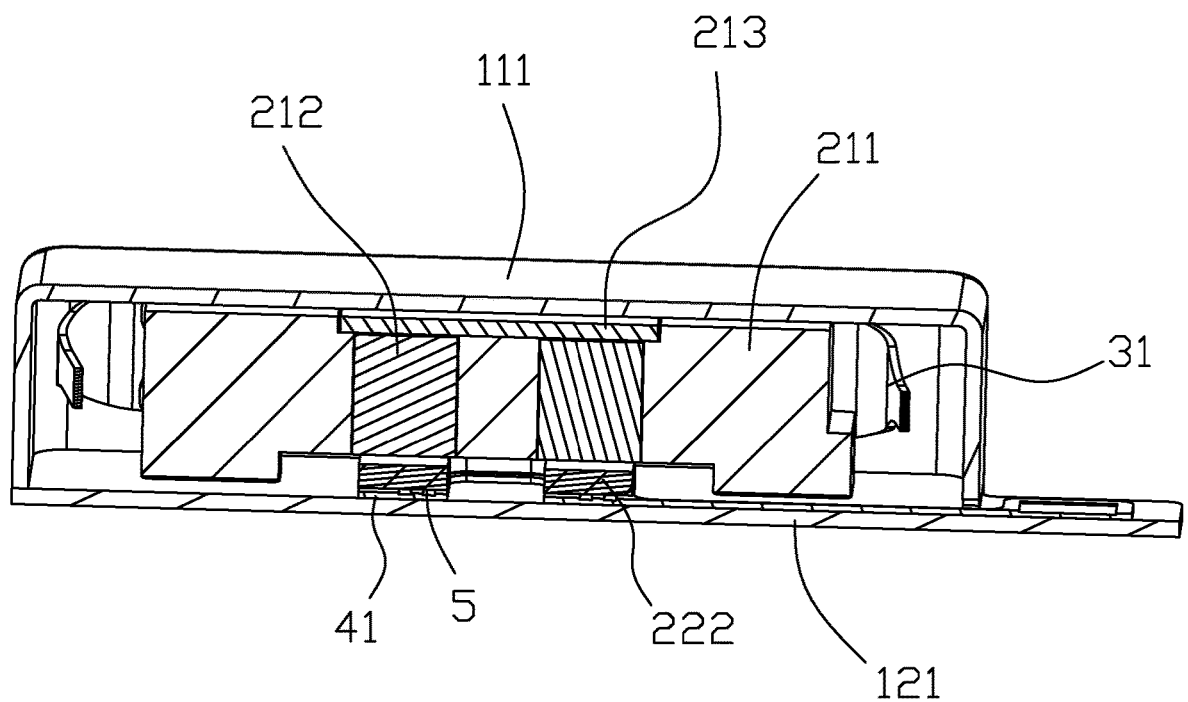
FIG. 2 is a sectional view of an assembled structure of a vibration motor according to Embodiment 1 of the present disclosure.

As shown in FIG. 1 and FIG. 2, the present disclosure provides a vibration motor 100 with a single vibrator, including a housing 1 having an accommodating space, a first vibrator 21 accommodated in the housing 1 and having a magnetic steel 212, an elastic part 3 elastically supporting the first vibrator 21, a driving apparatus driving the first vibrator 21 to vibrate, an electrically connected component 4 electrically connected to the outside, and a primary coil 5 implementing an electrical connection of the driving apparatus.

The housing 1 is of an elongated structure, including a top wall 111, a bottom wall 121, a side wall 112 connecting the top wall 111 and the bottom wall 121. Specifically, in this implementation, the housing 1 includes a cover 11 and a baseplate 12 that is covered by the cover 11 and that forms the accommodating space with the cover 11. The top wall 111 and the side wall 112 are disposed on the cover 11, and the bottom wall 121 is disposed on the baseplate 12. Naturally, in another alternative implementation, the housing 1 may have an integral structure, or the side wall may be disposed on the baseplate 12 while the cover 11 has a flat structure. All these are implementable.

The electrically connected component 4 is a circuit board disposed on the bottom wall 121 of the housing 1. A secondary coil 222 disposed opposite to the primary coil 5 serves as the driving apparatus. The secondary coil 222 is attached to a surface of the circuit board and disposed opposite to the primary coil 5. The secondary coil 222 is disposed opposite to the magnetic steel 212. Specifically, in this implementation, the circuit board is of a tabulate structure, and the primary coil 5 is processed on the circuit board. The primary coil 5 is electrically connected to the outside and generates an alternating electromagnetic field, to cause the secondary coil 222 to generate an induced electromotive force, and cause relative vibration between the secondary coil 222 and the first vibrator 21.

The first vibrator 21 includes a first counterweight 211, a magnetic steel 212 disposed on the first counterweight 211, and a first magnetic conductive plate 213 attached to the first counterweight 211 and covering the magnetic steel 212. The first counterweight 211 includes a through-hole 2110 running through an upper and a lower surface of the first counterweight, and the magnetic steel 212 includes at least one permanent magnet disposed in the through-hole 2110. In this implementation, there are two through-holes 2110, disposed separately on the first counterweight 211. There are two magnetic steels 212, disposed in the two through-holes 2110 respectively. The magnetic steel 212 corresponds to the secondary coil 222.

The elastic part 3 is two C-type springs disposed at two ends of the first vibrator 21 respectively. One end of the C-type spring is connected to the first vibrator 21, and the other end is connected to the side wall 112 of the housing 1, and the C-type spring supports the first vibrator 21 to vibrate in a direction parallel to the bottom wall 121. Specifically, the elastic part 3 includes a first fixed portion 311 connected to the first counterweight 211 of the first vibrator 21, a second fixed portion 312 connected to the side wall 112, and a connecting portion 313 connecting the first fixed portion 311 and the second fixed portion 312.

Embodiment 2

Figure 3:
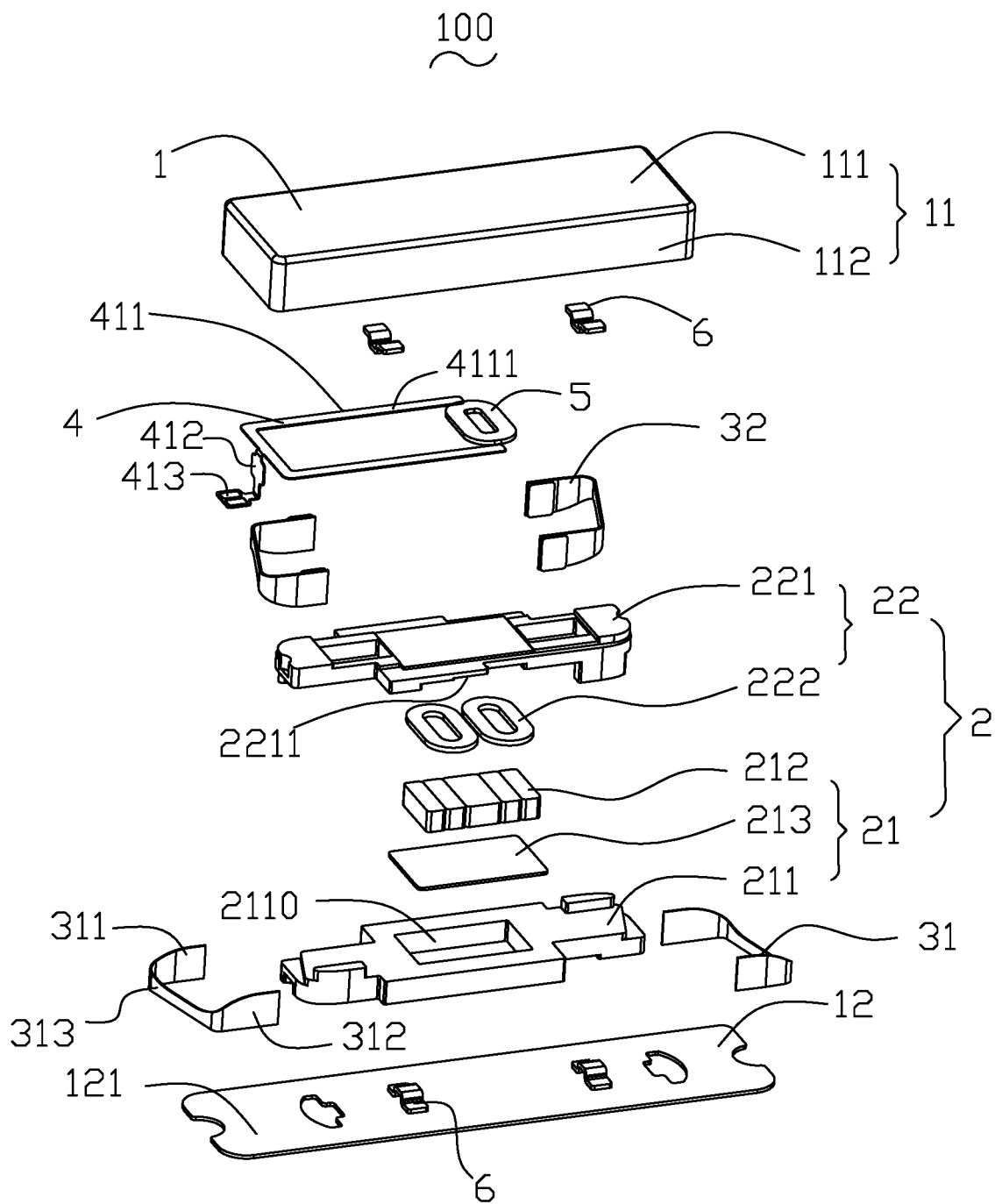
FIG. 3 is an exploded schematic structural diagram of a vibration motor according to Embodiment 2 of the present disclosure.
Figure 4:
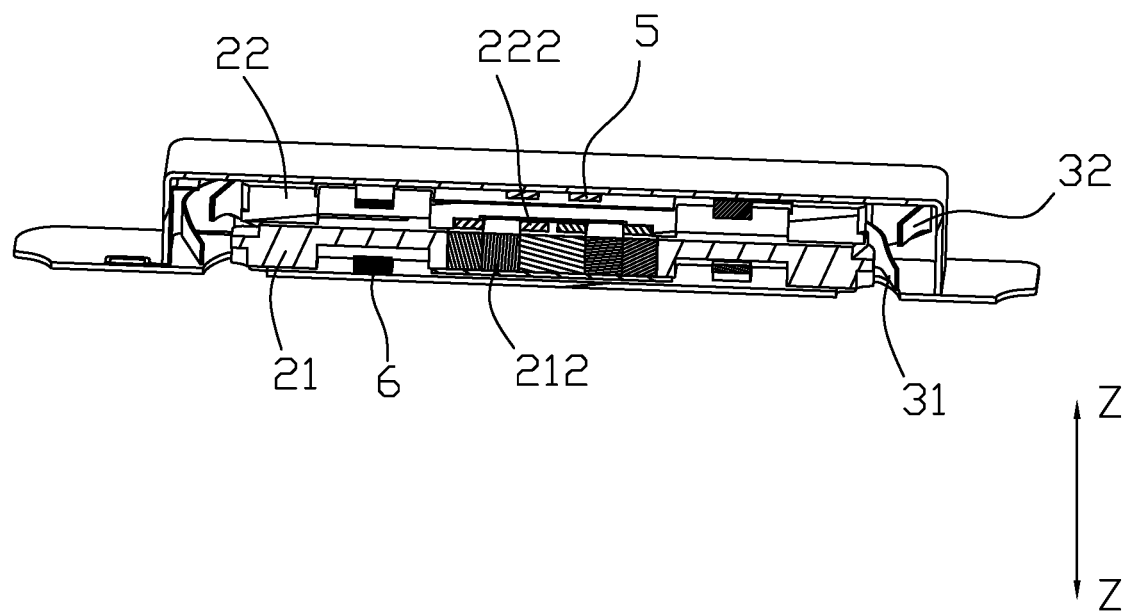
FIG. 4 is a sectional view of an assembled structure of a vibration motor according to Embodiment 2 of the present disclosure.

FIG. 3 and FIG. 4 show a second implementation of the present disclosure. The second implementation is roughly the same as the first implementation, and a difference only lies in that this implementation is applied to a dual-vibrator vibration motor. The vibrators 2 include a first vibrator 21 and a second vibrator 22 that move relatively along a direction perpendicular to a vibration direction. The direction perpendicular to the vibration direction is a thickness direction of the vibration motor, that is, a Z-Z direction in FIG. 4. A magnetic steel 212 is disposed on one of the first vibrator 21 and the second vibrator 22, and the secondary coil 222 corresponding to the magnetic steel 212 is disposed on the other one of the first vibrator 21 and the second vibrator 22. Specifically, in this implementation, the magnetic steel 212 is disposed on the first vibrator 21, and the secondary coil 222 is disposed on the second vibrator 22. The secondary coil 222 generates an alternating electromotive force after the secondary coil 222 and the primary coil 5 are powered up, to cause the first vibrator 21 and the second vibrator 22 to move relative to each other along different trajectories parallel to the bottom wall 121.

The first vibrator 21 includes a first counterweight 211, a magnetic steel 212 fixed on the first counterweight 211, and a first magnetic conductive plate 213 attached to the first counterweight 211 and covering the magnetic steel 212. The first magnetic conductive plate 213 is used to converge divergent magnetic induction lines to improve the magnetic induction intensity. The first counterweight 211 includes a through-hole 2110 running through an upper and a lower surface of the first counterweight, and the magnetic steel 212 includes at least one permanent magnet disposed in the through-hole 2110 of the first counterweight 211. In this implementation, there is one through-hole 2110, disposed on the first counterweight 211. In another alternative implementation, a plurality of magnetic steels may be disposed in a plurality of through-holes, which is also implementable. Certainly, a quantity and a structure of a magnetic circuit are not limited thereto.

The second vibrator 22 includes a second counterweight 221, and a secondary coil 222 disposed on the second vibrator 22. A fixing groove 2211 used to fix the secondary coil 222 is provided on the second counterweight 221, and the secondary coil 222 is fixed in the fixing groove 2211. In this implementation, there are two secondary coils 222, which are disposed parallel to each other in a plane in the fixing groove 2211. The second counterweight 221 is made of a magnetically non-conductive material. In this way, it can be ensured that no electromagnetic interference is generated between the secondary coil 222 and the primary coil 5, thereby improving magnetic induction efficiency.

An elastic part 3 includes a first elastic part 31 elastically supporting the first vibrator 21 and a second elastic part 32 elastically supporting the second vibrator 22. The first elastic part 31 and the second elastic part 32 are a pair of C-type springs. One end of the C-type spring is fixed on the vibrator 2, and the other end is fixed on a side wall 112 of a housing 1. The first elastic part 31 and the second elastic part 32 independently support the first vibrator 21 and the second vibrator 22.

The first elastic part 31 includes a first fixed portion 311 connected to the first counterweight 211 of the first vibrator 21, a second fixed portion 312 connected to the side wall 112 of the housing 1, and a connecting portion 313 connecting the first fixed portion 311 and the second fixed portion 312. Specifically, in this implementation, the structure of the second elastic part 32 is the same as that of the first elastic part 31. Naturally, in another alternative implementation, the second elastic part 32 may alternatively use another structure different from that of the first elastic part 31. This is implementable provided that the structure has a function of supporting and fixing a corresponding vibrator.

An electrically connected component 4 is a circuit board disposed on the housing and electrically connected to the outside. The circuit board is attached to a top wall 111 of the housing 1 and extends to the outside of the housing 1, and is configured to implement an electric connection to the outside.

Specifically, the circuit board includes a main body portion 411 attached on the top wall 111, an extending portion 412 bent and extended from the main body portion 411 toward the bottom wall 121, and a first conducting end 413 bent and extended from the extending portion 412. The extending portion 412 is attached to the side wall 112, and the first conducting end 413 is attached to the bottom wall 121 and extends to the outside of the housing 1, to implement an electric connection to the outside. The main body portion 411 includes two second conducting ends 4111 located at two sides of the top wall 111 respectively. The primary coil 5 is disposed between the two second conducting ends 4111, and lead wires of two voice coils of the primary coil 5 are electrically connected to the second conducting end 4111 respectively. Further, to avoid overamplitude vibration of the vibrator 2, a protruding limiting portion 6 is provided on the housing 1. Specifically, in this implementation, a limiting portion 6 configured to limit the second vibrator 22 is disposed on the top wall 111, and a limiting portion configured to limit the first vibrator 21 is disposed on the bottom wall 121. In this way, reliability of the product can further be improved.

A vibration motor in the present disclosure includes a housing having an accommodating space, a first vibrator accommodated in the housing and having a magnetic steel, a driving apparatus disposed opposite to the magnetic steel and configured to drive the first vibrator, an elastic part elastically supporting the first vibrator, and an electrically connected component. The electrically connected component includes a circuit board disposed on the housing and electrically connected to the outside, and a primary coil electrically connected to the circuit board. The driving apparatus is a secondary coil disposed separately from the primary coil. The primary coil is electrically connected to the outside to generate an alternating electromagnetic field, to cause the secondary coil and generates an induced electromotive force, and cause relative vibration between the secondary coil and the first vibrator. According to the present disclosure, a new electrical connection manner is used, and a circuit or a cable does not need to be disposed in the housing of the vibration motor, so that a structure can be simplified, a space can be saved, and reliability problems such as winding and breaking caused due to complex cabling are avoided, thereby effectively improving the product reliability performance.

Although the embodiments of the present disclosure are shown and described above, it can be understood that the embodiments are exemplary and cannot be construed as limitations to the present disclosure, and a person of ordinary skill in the art can make changes, modifications, replacement, and variations to the embodiments within the scope of the present disclosure.

What is claimed is:

1. A vibration motor, comprising an housing having an accommodating space, a first vibrator accommodated in the housing and having a magnetic steel, a driving apparatus disposed opposite to the magnetic steel and configured to drive the first vibrator, an elastic part elastically supporting the first vibrator, and a circuit board, wherein the vibration motor further comprises a primary coil electrically connected to the circuit board, the driving apparatus comprises a secondary coil disposed separately from the primary coil, the primary coil is electrically connected to the outside by using the circuit board and generates an alternating electromagnetic field, to cause the secondary coil to generate an induced electromotive force, and cause relative vibration between the secondary coil and the first vibrator;

wherein a second vibrator disposed opposite to the first vibrator and perpendicular to a vibration direction is provided in the housing, the elastic part comprises a first elastic part elastically supporting the first vibrator and a second elastic part elastically supporting the second vibrator, the secondary coil is disposed on the second vibrator, and the secondary coil interacts with the magnetic steel to generate a driving force to drive the first vibrator and the second vibrator to move relative to each other.

2. The vibration motor according to claim 1, wherein the housing comprises a top wall, a bottom wall disposed opposite to the top wall, and a side wall connecting the top wall and the bottom wall, the circuit board is disposed on the bottom wall, and the primary coil is processed on the circuit board.

3. The vibration motor according to claim 2, wherein the secondary coil is attached to a surface of the circuit board and disposed opposite to the primary coil.

4. The vibration motor according to claim 1, wherein the housing comprises a top wall, a bottom wall, and a side wall connecting the top wall and the bottom wall, and the circuit board comprises a main body portion attached to the top wall, an extending portion bent and extended from the main body portion toward the bottom wall, and a first conducting end bent and extended from the extending portion.

5. The vibration motor according to claim 4, wherein the main body portion comprises two second conducting ends located at two sides of the top wall respectively, and the primary coil is disposed between the two second conducting ends and electrically connected to the second conducting ends.

6. The vibration motor according to claim 4, wherein the extending portion is attached to the side wall, and the first conducting end is attached to the bottom wall and extends to the outside of the housing.

7. The vibration motor according to claim 1, wherein there are two secondary coils in total.

8. The vibration motor according to claim 1, wherein the first vibrator comprises a first counterweight, the first counterweight is provided with a through-hole running through an upper and a lower surface of the first counterweight, the magnetic steel comprises at least one permanent magnet disposed in the through-hole, and the permanent magnet is disposed corresponding to the secondary coil.

9. The vibration motor according to claim 8, wherein the second vibrator comprises a second counterweight, the second counterweight is provided with a fixing groove that is recessed in a direction away from the first counterweight, the secondary coil is fixed in the fixing groove, and the second counterweight is made of a magnetically non-conductive material.

\* \* \* \* \*